United States Patent

[11] 3,582,033

[72] Inventors Oakley A. LaFleche
 Eureka Springs, Ark.;
 Harry Wonell, Garden City, Mich.
[21] Appl. No. 830,629
[22] Filed June 5, 1969
 Division of Ser. No. 614,863, Feb. 9, 1967, Pat. No. 3,469,812
[45] Patented June 1, 1971
[73] Assignee Howell Industries, Incorporated
 Detroit, Mich.

[54] ADJUSTABLE VEHICLE SEAT MOUNTING
 9 Claims, 5 Drawing Figs.
[52] U.S. Cl. .................................................. 248/430, 248/420
[51] Int. Cl. .................................................. B60n 1/08, F16m 13/00
[50] Field of Search ........................................ 248/420, 423, 424, 429, 430; 297/346

[56] References Cited
UNITED STATES PATENTS

| | | | |
|---|---|---|---|
| 2,235,904 | 3/1941 | Schulz | 248/430 |
| 2,614,608 | 10/1952 | Ardussi | 297/346 |
| 3,120,371 | 2/1964 | Dall | 248/430 |
| 3,207,554 | 9/1965 | Dall | 248/429 |
| 3,237,907 | 3/1966 | Dall | 248/430 |
| 3,310,274 | 3/1967 | Tanaka et al. | 248/430 |
| 3,350,046 | 10/1967 | Kirk | 248/430 |

FOREIGN PATENTS

| | | | |
|---|---|---|---|
| 566,665 | 11/1958 | Canada | 248/430 |

Primary Examiner—Marion Parsons, Jr.
Attorney—Hauke, Gifford and Patalidis

ABSTRACT: A pair of interconnected, spaced-apart slide devices arranged to support a seat assembly between longitudinally spaced positions relative to the floor of a vehicle. Each slide device includes an upper support member for attachment to the seat unit, a lower support fixed to the vehicle floor, means providing a track between the upper and lower support members and latch means for locking the upper and lower supports at a selected relative position. The upper support member also has means for anchoring the terminal ends of a safety belt assembly associated with the seat assembly. The upper support also has a pair of rigid flange sections straddling a slide unit and arranged to prevent separation of the slide unit components. The latching means includes a latch member associated with each of the slide devices and interconnected one to the other for cooperative movement between a first position wherein the latches engage a selected pair of teeth formed in the lower fixed supports to lock the two supports one to the other and a second position wherein the latches disengage the teeth to free the upper movable supports for longitudinal movement relative to their respective lower fixed supports.

PATENTED JUN 1 1971  3,582,033

INVENTORS
OAKLEY A. LAFLECHE
HARRY WONELL.

*Hauke, Gifford & Patalidis*

ATTORNEY

ADJUSTABLE VEHICLE SEAT MOUNTING

REFERENCE TO RELATED APPLICATION

This is a division from application Ser. No. 614,863, filed Feb. 9, 1967 now U.S. Pat. No. 3,469,812.

BACKGROUND OF THE INVENTION

1. Field of the Invention

This invention relates to a vehicle seat, and more particularly to an adjustable supporting apparatus permitting a seat assembly to be selectively locked various adjusted positions relative to a fixed portion of the vehicle.

2. Description of the Prior Art

Conventional adjustable seat devices comprise a pair of laterally spaced, supporting apparatus having an individual latching means interconnected one to the other and operatively connected to a release handle. The supporting apparatus normally takes the form of an upper support attached to the seat assembly, a lower support fixed to the floor of the vehicle and some sort of slide mechanism interconnecting the upper and lower supports for relative longitudinal movement parallel to the longitudinal axis of the vehicle. A latch mechanism associated with the supporting device permits the upper and lower supports to be locked in a selected relative position generally corresponding to the physical dimensions of the occupant of the seat.

Conventional adjustable seat mounting devices of the aforementioned type have a number of drawbacks generally related to safety features and reflected in the degree of distortion that takes place in the device during a sudden deceleration produced by a collision or similar type of accident. One disadvantage is related to the slide assembly interconnecting upper and lower support members.

Normally, the slide assembly comprises a pair of companion, elongated, U-shaped slide members having laterally formed portions of their sidewalls interconnected to one another by ball or roller bearings arranged to provide a relatively frictionless adjustment. Inertial forces acting on the seat assembly during a sudden deceleration produce a transverse force on the slide assembly tending to bend the sidewalls outwardly so that they separate or "peel" one from the other. The preferred embodiment of the present invention obviates this problem by providing an upper support member arranged to prevent the lateral bending of the sidewalls of the slide members so that their relative separation is prevented.

Another problem of the seat mounting apparatus of the prior art is related to the means for anchoring the fixed end of safety seat belt devices. It is common practice to anchor the terminal ends of seat belts to a fixed lower portion of the vehicle, normally the floor. The reason for this arrangement is to prevent a sudden displacement of the occupant of the seat relative to the vehicle in the event of a sudden deceleration so that the occupant is not thrown against various injury producing portions of the interior of the vehicle. The disadvantage of this arrangement is that while the seat belt assembly restrains the occupant against a forward displacement, high inertial forces tend to force the seat assembly forward so that the occupant is sandwiched between the seat belt and the seat assembly and incurs serious internal injuries. The preferred embodiment of the present invention obviates this problem by providing means for anchoring the terminal ends of the seat belt assembly to the movable portion of the seat mounting apparatus so that the seat belt, the occupant, and the seat assembly are shifted forward as a unit.

Another problem associated with conventional slide devices is related to the means for locking the companion support members one to the other at a fixed relative position. Conventional latch devices take the form of a latch member pivotally attached to one of the slide members and engageable with a series of teeth formed in the opposite slide member. This latching arrangement has two serious disadvantages which take the form of a reduction in the stress-transmitting sections of the slide members. The teeth are normally provided in a flange section of one of the slide members thereby removing portions of a stress-transmitting area. The preferred embodiment of the present invention obviates these structural weakening problems by providing a ratchet locking device in which the locking teeth are provided only on the stationary seat support members.

SUMMARY OF THE INVENTION

The preferred embodiment of the present invention takes the form of an elongated, flat, upright fixed support member attached to the floor of the vehicle and interconnected through a suitable slide assembly with a movable support member adapted for attachment to the seat assembly. The movable support member has a generally U-shaped cross section including a pair of rigid downwardly depending flanges straddling the fixed support member. A suitable slide device is arranged between the flange portions to provide means for sliding movement between the support members. The flange portions of the movable support member provide a rigid reinforcement for preventing separation of the slide assembly components in the event of a sudden deceleration.

The lower fixed support member is provided with a series of teeth and a connecting slot each of which is associated with a selected relative position of the seat assembly with respect to the floor of the vehicle. The flange portions of the movable support member are apertured to receive a latch member pivotally movable relative to the direction of longitudinal movement of the support members. The latch member is displaceable between a first position wherein it engages a selected tooth in the fixed support member to rigidly lock the two supports one to the other and a second position wherein the latch is moved away from the teeth so that the upper movable support member is free for longitudinal movement with respect to the lower fixed support member.

Preferably the slide devices are arranged in oppositely spaced pairs on the floor of the vehicle with the slide device associated with the driver side provided with a suitable handle for actuation of the latch member. The two opposite latch members are interconnected through a wire for simultaneous operation.

It is therefore an object of the present invention to provide a safer adjustable seat mounting device for a vehicle having a seat belt assembly for restraining an occupant disposed in the seat assembly by providing means for anchoring the terminal ends of the seat belt assembly to the moveable sections of the seat mounting device.

It is another object of the present invention to improve the construction of adjustable seat mounting devices having a movable support member connected to a fixed support member through a slide assembly by providing a movable support member having rigid, unyielding flange portions straddling the slide assembly to prevent separation of the components thereof.

It is a still further object of the present invention to prevent peeling or separation of the interengaged sidewalls of the companion members of slide assemblies in adjustable seat mounting apparatus by providing a rigid reinforcing member having spaced side flanges arranged to prevent lateral movement of the sidewalls of the companion slide members.

A still further object of the present invention is to provide an improved latching arrangement for locking the movable portion of a seat-mounting apparatus to the fixed portion by providing a latch member engageable with a selected one of a series of teeth formed in the fixed supporting member.

Still further objects and advantages of the present invention will readily occur to one skilled in the art to which the invention pertains upon reference to the following detailed description.

BRIEF DESCRIPTION OF THE DRAWINGS

The description refers to the accompanying drawings in which like reference characters refer to like parts throughout the several views and in which.

DESCRIPTION OF THE PREFERRED EMBODIMENTS

Figure 1:
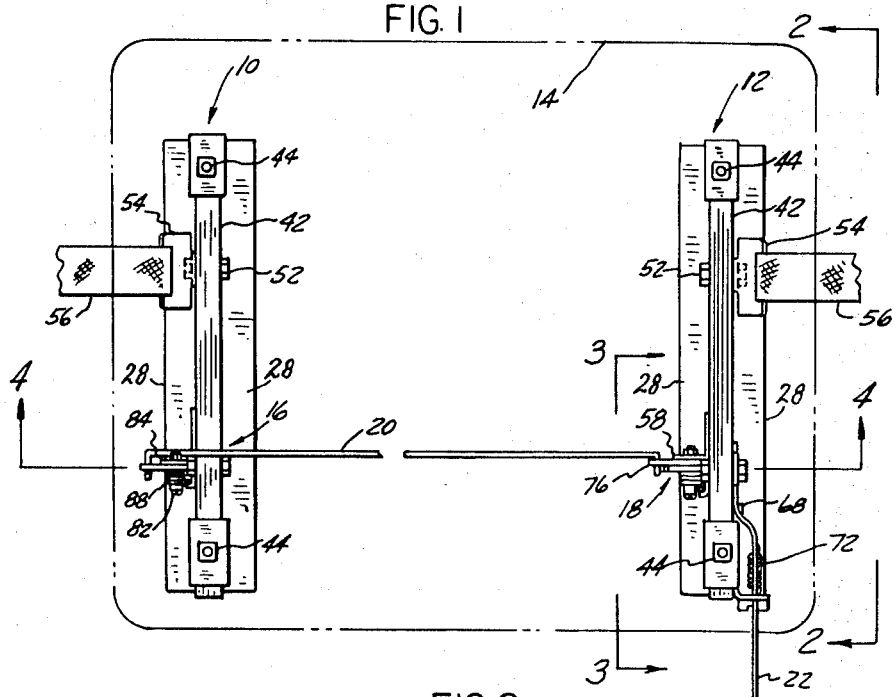
FIG. 1 is a top plan view illustrating a pair of interconnected slide devices illustrating one preferred embodiment of the invention.

Referring to the drawings, FIGS. 1 to 5 illustrate a preferred seat mounting arrangement as comprising a pair of laterally spaced slide devices 10 and 12 provided with opposite latching mechanisms 16 and 18 interconnected by a wire 20. A handle 22 is operably engageable with the latch mechanism 18 to produce simultaneous engagement and disengagement of the latch mechanisms 16 and 18 in a manner which will be subsequently described. The slide devices 10 and 12 are arranged to support a seating unit 24 for relative adjustable displacement with respect to the floor 14.

Slide devices 10 and 12 each include a lower support member 26 having a pair of laterally directed flange portions 28 adapted for connection to the floor 14 by suitable means.

The lower support members 26 each have an upright section defining an elongated track 30 generally running in a fore and aft direction with respect to the vehicle. Each upright lower support member 26 is also provided with a pair of elongated slots 34 and 36 having side edges running parallel to the track 30. A rack 38 is provided in each lower support member 26, spaced below the slot 34. Each rack 38 has a series of teeth 40 extending in a direction parallel to the side edges of the slots 34 and 36 and the track 30. The rack 38 has a length defining the limits of longitudinal displacement between the seat 24 and the floor 14.

Figure 2:
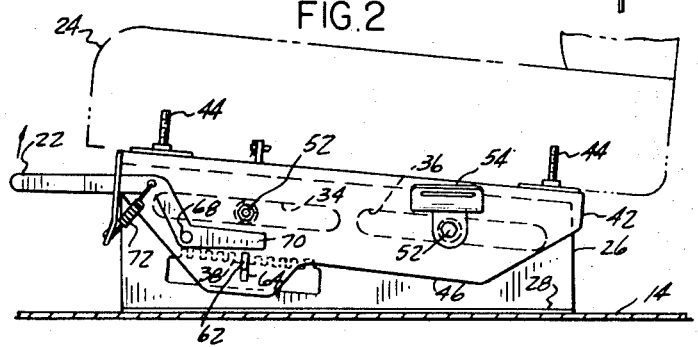
FIG. 2 is an elevational view on one of the slide devices taken along lines 2-2 of FIG. 1.
Figure 3:
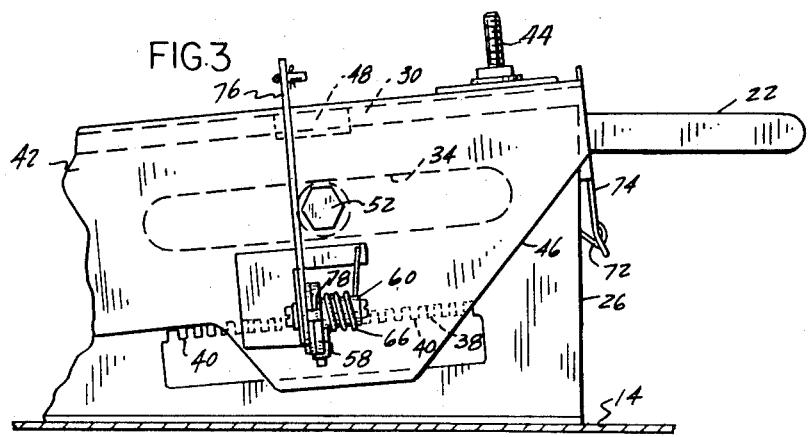
FIG. 3 is an enlarged fragmentary view of one of the slide devices taken along lines 3-3 of FIG. 1.
Figure 5:
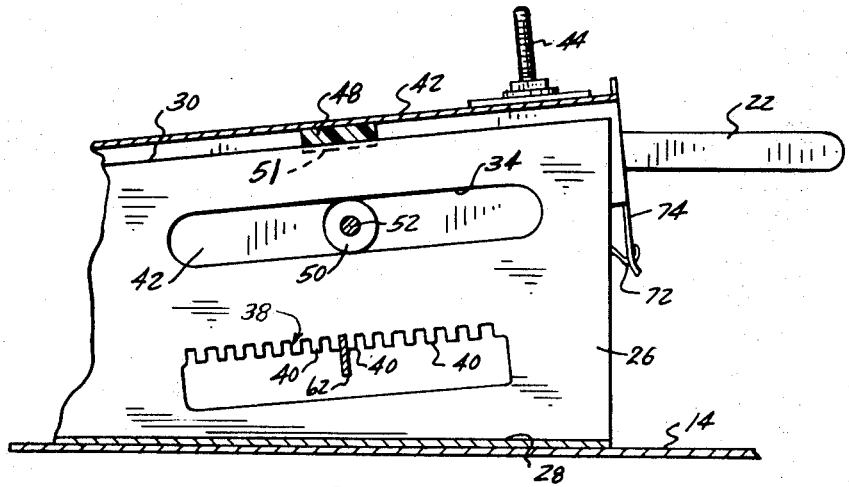
FIG. 5 is an enlarged fragmentary view of the slide devices illustrated in FIG. 3, but with parts broken away for purposes of description.

As can best be seen in FIGS. 2, 3 and 5, an upper support member 42 mounted on each of the lower support members 26 has upwardly directed threaded members 44 to provide a means for attachment to the seat assembly 24.

The upper support member 42 has a pair of spaced, downwardly depending flange sections 46 (FIG. 4) straddling the lower support 26.

Figure 4:
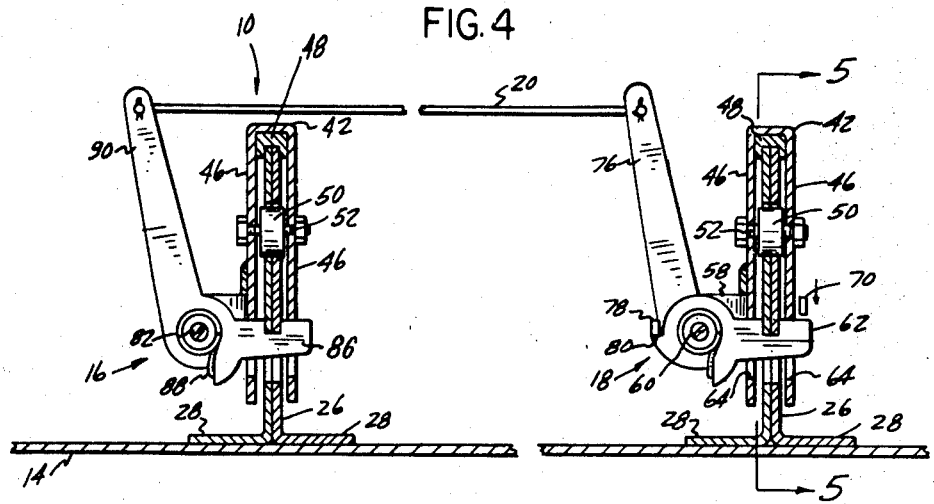
FIG. 4 is a view taken along lines 4-4 of FIG. 1 and illustrating the cross section of the preferred slide devices.

Referring to FIGS. 4 and 5, a pair of nylon spacers 48, only one of which is shown, are retained in notches 51 formed in the track 30 and provide a slidable engagement with the upper support member 42.

Each upper support member 42 is also provided with a pair of spaced-apart roller bearings 50, each journaled on a stud member 52 carried by the flanges 46. As can best be seen in FIGS. 2 and 5, the roller members 50 are each associated with the slot 34 and 36 and are received therein to provide a rolling, antifriction engagement between the upper support member 42 and the lower support member 26. Preferably the roller members 50 have a diameter corresponding to the distance between the side edges of the slots 34 and 36 to eliminate any play or looseness between the support members.

Each of the rearward studs 52 associated with the rearward roller members 50 in slot 36 are also provide means for attaching a seat belt fixture 54 (FIGS. 1 and 2). The fixtures 54 provide a means for anchoring the looped terminal ends of seat belts 56. Thus, it can be seen that the seat belts 56 move with the upper movable support member 42 as it is adjusted between forward and rearward positions relative to the lower support member 26. Furthermore, it can be seen that, when the latching means 16 and 18 are in disengaged position, the upper support members 42 are freely movable with respect to the lower support members 26.

Now referring to FIGS. 1, 3 and 4, the latching means 18 comprises a flange 58 extending normal to the inner flange 46 of the slide device 12. A pin 60 is carried by the flange 58 and is supported on an axis generally parallel to the rack 38. As can best be seen in FIG. 4, a latch member 62 is carried by the pin 60 and extends through vertically, elongated apertures 64 provided in each of the flanges 46. The apertures 64 register with the rack 38 so that the latch 62 is pivotal between a raised position wherein it engages a selected pair of teeth 40 to lock the upper support member 42 to the lower support member 26 and a lowered position wherein it releases the teeth 40 to permit free movement of the upper support member 42 with respect to the lower support member 26. As can best be seen in FIG. 3, a spring biased member 66 wrapped around the pin 60 has one end acting against the flange 46 and its opposite end reacting against the latch member 62 to maintain it in a normally raised and engaged position.

Referring to FIGS. 1 and 2, the handle 22 is pivotally connected by a pin 68 to the outer flange 46 and has an end portion 70 arranged to engage the outer end of the latch member 62. Thus by raising the outer end of the handle 22, the end portion 70 produces a downward force on the latch 64 sufficient to disengage the latch member 12 from the rack 38 to permit slidable movement of the upper support member 42 with respect to the lower support member 26. The outer end of the handle 22 is normally maintained in a lowered downward position by a spring member 72 having one end connected to the handle 22 and the opposite end engaged with a lateral flange 74 carried by the flange 46.

As can best be seen in FIGS. 1 and 4, a lever member 76 is supported for pivotal movement on the pin 60 and carries a finger 78 engageable with an abutment 80 provided on the latch member 62. The lever is member 76 arranged for pivotal movement toward and away from the upper support member 42. When the handle 22 is raised to lower the latch member 62 from engagement with the rack 38, the abutment 80 produces an upward force on the finger 78 so that the lever 76 pivots toward the right, as viewed in FIG. 4.

The latching means 16 of the slide device 10 comprises a pin 82 supported by a flange 84 in a manner similar to the supporting arrangement for the pin 60 in the latching means 18. A latch member 86 is journaled to the pin 8 and pivotal between a raised position wherein the latch member 86 engages the rack 38 of the slide device 10 and a lowered position wherein the latch member 86 disengages its associated rack 38. A spring 88 is wrapped around the pin 82 and acts against the flange 46 and react against the latch member 86 to normally maintain the latch member 86 in a raised position.

The latch member 86 is also provided with an upwardly directed lever member 90 having its free end connected to one end of the wire 20 while the other end of the wire 20 is connected to the free end of the lever member 76. Thus, it can be seen that the lever members 76 and 90 are movable in combination so that when the handle 22 is raised to disengage the latch member from its associated rack 62 the latch member 86 is simultaneously lowered to disengage its associated rack.

As thus far described, we have illustrated in detail a rugged slide assembly comprising relatively few parts and having a movable upper support member 42 arranged so that its downwardly depending flange sections prevent separation from the lower support member 26 by the studs 52, the rollers 50 and the latch and rack assembly.

It is therefore to be understood that we have described an improved adjustable mounting device having a movable support member adapted for attachment to a seat assembly and interconnected through a suitable slide device to a lower support member attached to the floor of the vehicle. The movable supports have means for attaching the lower terminal ends of a seat belt assembly. We have also described an improved seat mounting wherein the upper support member is provided with rigid downwardly depending flange sections straddling the lower fixed support member in a manner to maintain the slide assembly in a connected condition when subjected to high inertial forces tending to separate the slide devices. We have also described an improved seat mounting apparatus having a novel latch arrangement for interconnecting the upper support member directly to the lower support member to provide a rigid assembly able to withstand high transverse forces tending to separate the support members.

It is also to be understood that we have described an improved seat-mounting device wherein the rack and latch arrangement is remotely positioned from the slide arrangement so that the slide units which take the form of the roller members 50 and elongated slots 34—36 are not structurally weakened by the latch arrangement.

Although we have described a preferred embodiment of our invention, it is to be understood that various changes and revisions can be made therein without departing from the spirit of the invention or the scope of the appended claims.

We claim:

1. An adjustable vehicle seat mounting comprising:
   a pair of fixed lower support members, each of said lower support members being provided with an elongated opening having a plurality of teeth provided along the upper edge thereof;
   a pair of upper support members slidably disposed upon said lower support members for longitudinal movement relative thereto, each of said upper support members comprising a generally U-shaped cross section defined by downwardly depending side flanges extending along opposite sides of said lower support members connected by a bridge portion extending over the top of said lower support members;
   a pair of aligned apertures in each of said upper support members registering with each of said elongated openings in said lower support members;
   latch means pivotally secured to one side flange of each of said upper support members, each of said latch means having a portion extending through said pair of aligned apertures in said side flanges of each of said upper support members and through said elongated opening in each of said lower support members, such that said portion of each of said latch means extends outwardly of the other of said side flanges of each of said upper support members;
   means biasing each portion of said latch means to a first position for normal engagement between a selected pair of said teeth of said openings to thereby lock said upper support members against longitudinal movement relative to said lower support members;
   handle means pivotally secured to the other side flange of one of said upper support members, said handle means being movable between a first position wherein it is spaced from the outwardly extended portion of said latch means associated with said one upper support member, and a second position wherein said handle means engages said last-mentioned latch outwardly extending portion to pivot the same downwardly to a second position out of engagement with said selected pair of said teeth to free said one upper support member for movement along said roller support members; and
   means for operatively connecting said last-mentioned latch means to the other of said latch means for pivoting said other latch means from said first position to a second position out of engagement with its associated pair of teeth.

2. The seat mounting defined in claim 1, wherein said handle means comprises a lever pivotally mounted on said other side flange of said one upper support member, said lever having a handle portion of a predetermined length and an opposite end portion of a selected length less than said first-mentioned predetermined length, said handle portion and said end portion extending in opposite directions from the point of pivotal movement of said lever, said opposite end portion being disposed over said outwardly extending portion of said latch means associated with said one upper support member so that upon movement of said opposite end portion of said lever by actuation of said handle portion, said end portion exerts a force on said latch extended portion to pivot said latch means out of engagement with said selected pair of teeth; and means normally biasing said end portion to said first-mentioned portion.

3. The seat mounting defined in claim 2, wherein said last-mentioned biasing means comprises: a spring, one end of which is carried by said handle portion, the other end of which is carried by said other side flange of said one upper support member to normally pivot said handle portion downwardly and thus pivot said opposite end portion upwardly away from engagement with said outwardly extended latch portion.

4. A vehicle seat mounting comprising:
   a pair of fixed lower support members, each of said lower support members being provided with an elongated opening having a plurality of teeth provided along the upper edge thereof;
   a pair of upper support members slidably disposed on said lower support members for longitudinal movement relative thereto, each of said upper support members comprising a generally U-shaped cross section defined by downwardly depending side flanges extending along opposite sides of said lower support members connected by a bridge portion extending over the top of said lower support members;
   a pair of aligned apertures in each of said side flanges of each of said upper support members registering with said elongated openings in each of said lower support members;
   one of said upper support members and the lower support member associated therewith defining a first slide mechanism, the other of said upper support members and the lower support member associated therewith defining a second slide mechanism, said first and second slide mechanisms being spaced-apart a selected distance such that one side flange of said first slide mechanism is in opposing relationship to one side flange of said second slide mechanism;
   a pair of latch means, one of said latch means being pivotally secured to said one side flange of said first slide mechanism and having a portion extending through said pair of aligned apertures in said side flanges of said upper support member and through said elongated opening in the lower support member of said first slide mechanism, the other of said latch means being pivotally secured to the other side flange of said second slide mechanism, said other latch means having a portion extending through said pair of aligned apertures in said side flanges of said upper support member and through the elongated opening in said lower support member of said second slide mechanism;
   each of said latch means being movable between a first position for normal engagement between a selected pair of said teeth of said openings to thereby lock said upper support members against longitudinal movement relative to their associated lower support members and a second position wherein said latch means are moved out of engagement with said selected pair of teeth to free said upper support members for movement along their associated lower support members;
   a pair of lever arms associated with each of said latch means, said lever arms being mounted for pivotal movement and extending in an upwardly fashion;
   means connecting the upper ends of said lever arms such that pivotal movement of one of said latch means causes simultaneous pivotal movement of its associated lever arm, the other of said lever arms and pivotal movement of the other of said latch means;
   means biasing said latch means to said first-mentioned position; and
   means for operatively engaging said one of said latch means to pivot the same to said second position whereby said connecting means between said pair of lever arms causes said other latching means to simultaneously move to said second position.

5. The mounting as defined in claim 4 wherein said operatively engaging means is adapted to engage the outwardly extending portion of the latch means carried by said first slide mechanism.

6. The seat mounting as defined in claim 4 wherein said operatively connecting means actuates the latch means carried by said first slide mechanism, said last-mentioned latch means comprising a flange member carried by said one side flange of said first slide mechanism; a latch member, one end of which is pivotally mounted to said flange member about an axis generally parallel to the axis of relative longitudinal movement of said upper and lower support members of said first slide mechanism, the other end of said latch member extending through said pair of apertures and engaging said selected pair of teeth associated with said first slide mechanism, said upwardly extending lever arm associated with said one latch means being supported for pivotal movement by said flange member about the same axis of pivotal movement as said latch member, said last-mentioned lever arm having a finger extending therefrom; said latch member having an abutment formed on said one end and engaging said lever arm finger to pivot said lever arm in the same direction about said pivot axis as said latch member pivots when actuated by said operatively engaging means; said pair of lever arms being connected in such a fashion that accidental disengagement of the latch mans associated with said second slide mechanism is ineffective to cause disengagement of the latch means associated with said first slide member as said one latch member associated lever arm is adapted for independent pivotal movement in the direction corresponding to the direction which causes disengagement of said latch member with said selected pair of teeth.

7. An adjustable vehicle seat mounting comprising:
   a pair of fixed lower support members, each of said lower support members being provided with a first elongated opening having a plurality of teeth provided along its upper edge, said lower support members each having a second elongated opening spaced from said first elongated opening, said second elongated opening being of a selected predetermined length;
   a pair of upper support members slidably disposed on said lower support members for longitudinal movement relative thereto, each of said upper support members comprising a generally U-shaped cross section defined by downwardly depending side flanges extending along opposite sides of said lower support members and connected by a bridge portion extending over the top of said lower support members;
   a pair of aligned apertures in each of said side flanges of each of said upper support members registering with said first elongated opening in said lower support members;
   fastening means extending through each side flange in each upper support member and said second elongated opening in each lower support member, said fastening means preventing separation of said side flanges when subjected to an external force;
   bearing means carried by each of said fastening means and disposed in said second elongated openings for providing a rolling antifriction engagement between the upper support members and their associated lower support members, the amount of relative longitudinal movement between each upper support member and its associated lower support member being limited by the abutment of said bearing means with the opposite ends of said second elongated opening;
   latch means pivotally secured to each of said upper support members and extending through said pair of aligned apertures in said side flanges of each of said upper support members and through said elongated openings in each of said lower support members;
   said latch means being movable between a first position for normal engagement between a selected pair of said teeth in said first elongated opening to thereby lock said upper support members against longitudinal movement relative to said lower support member; and
   means to move said latch means to a second position out of engagement with said selected pair of said teeth to free said upper support members for movement along said lower support members between the limits defined by the abutment of said bearing means with the opposite ends of said second elongated opening.

8. The seat mounting defined in claim 7 including means for mounting said seat to said upper support member.

9. The seat mounting as defined in claim 8 including means adapted to secure a safety belt to said fastening means such that said safety belt is movable with said upper support members as said upper support members move relative to said lower support members.

HII-100-A-1

UNITED STATES PATENT OFFICE
CERTIFICATE OF CORRECTION

Patent No. 3,582,033          Dated   June 1, 1971

Inventor(s) Oakley A. LaFleche and Harry Wondell

It is certified that error appears in the above-identified patent and that said Letters Patent are hereby corrected as shown below:

IN THE SPECIFICATION:

Col. 1, line 12, after "locked" insert --in--;

Col. 3, line 56, change "slot" to --slots--;

line 63, delete "are";

Col. 4, line 20, change "12" to --62--;

line 31, change "is member 76" to --member 76 is--;

line 40, change "8" to --82--;

line 45, after "46 and" delete "react against";

line 58, after "sections" insert --46--;

IN THE CLAIMS:

Col. 7, line 26, change "mans" to --means--;

Signed and sealed this 30th day of November 1971.

(SEAL)
Attest:

EDWARD M. FLETCHER, JR.          ROBERT GOTTSCHALK
Attesting Officer                Acting Commissioner of Patents